Patented July 10, 1928.

1,676,996

UNITED STATES PATENT OFFICE.

CONSTANTINE LEVENTIS, OF PHOENIX, ARIZONA.

GLAND SERUM.

No Drawing.    Application filed June 20, 1927. Serial No. 200,294.

This invention relates to serum and has for its object the provision of an improved serum. More particularly the invention aims to provide an improved serum effective against abnormal blood pressure and methods of producing the same. The invention further aims to provide in a particularly assimilable form serums, for injection into the human lymphatic system, comprising substances which the glands of the human organism have ceased to furnish in sufficient quantities.

It has heretofore been customary to designate as pathological causes of abnormally high or low blood pressures either Bright's disease, nephritis, decayed teeth, or some other local infection, or old age. These have not necessarily been considered the only causes of abnormal blood pressure, but they are usually considered the most frequent.

In studying the pathology of this abnormal condition of the circulatory vessels, the causes mentioned as provoking this condition and the therapy applied to cure this disease, I came to the conclusion that the real cause of this abnormal condition is not yet discovered and consequently the proper therapy cannot be applied.

Frequently we have associated with each other nephritis and high blood pressure, but there is a question which disease produces the other, especially is this true in old age. The opinion of medical men is divided, some accept the nephritis as the result of the high blood pressure and others the high blood pressure as the result of nephritis. As for decayed teeth and other local infections of the organism we can accept them as contributors, but not as the main cause of the disease, for if they were the main cause, the manifestation of the disease would be more widespread and numerous and would at the same time manifest itself more frequently in individual of all ages.

As a manifestation of old age this abnormal condition is essential, is self existing and frequently occurs in its inception without any other evident disturbance of the function of other organs. We admit this as a characteristic symptom consequent to old age. Consequently, it is evident that if we can cure old age we will at the same time cure the high blood pressure, this abnormal condition consequent to old age. Old age comes as a result of the exhausted vitality in the function of all organs and especially of the genitalia glands (testicles and ovaries), the normal function of which reflects upon the other important glands and influences their function.

This relation between old age and the function of those important glands has been known for a long time and many therapies have been suggested to restore the function of these glands and prevent thus the coming of old age and all its symptoms. The results of these therapies have at times seemed encouraging and at other times been very doubtful.

It has heretofore been customary in the therapy of symptoms of sensility to give to the old men by mouth or by injection extracts of the genitalia glands or to graft on their organisms glands of different animals and thus ameliorate the condition.

Therapy of this nature is not unreasonable and indeed there have been some indications of success, but the results taken as a whole are not so encouraging as had been expected and wished for. In my opinion this is so because the organism being already exhausted in its functions cannot work out and assimilate these substances given to it either by mouth, by injection or by implantation.

I have discovered that these substances may be prepared in such a way that they can be easily absorbed and assimilated when supplied to the human organism. In using the serum of the present invention I do not claim that I can prevent sensility but rather that I can improve a symptom of old age by providing the organism with substances which its own glands cannot prepare. Insulin, when used as a cure for diabetes, cannot restore the function of the pancreas, but it does provide the organism with substances which its own glands cannot supply.

In the practice of the invention I prepare the humanized gland serum as follows:

Donkeys over three years old which have previously been tested with tuberculin and mallein and which have been castrated at least six months before the start of the treatment, are provided as the source of the serum. An incision five inches long is made deep in the muscles of the flank of the donkey. In the thus prepared pocket I insert the whole gland, previously disencapsulated, and then close up the incision by stitching. The operation is carried out with the strictest antiseptic precautions possible.

In the practice of the invention when using the male donkey, as the source of serum, I implant the male gland or testicle, when using the female donkey I implant the female gland or ovary. When using donkeys as the source of serum, I prefer to use the corresponding glands taken from horses, but I may use the corresponding gland taken from donkeys.

The absorption of the glands by the organism of the donkey starts in a few days after the operation. Within two weeks the absorption is substantially complete, the swelling has subsided and the only evidence of the implantation is that something hard may be felt under the skin. At that time I inject the animals with one dose of 20 cc. of human serum. The reaction to the human serum injection is sometimes very severe but the animal recovers very rapidly. Seven days after the injection of the human serum, the animals are bled. To the collected serum is added 0.3 percent of tricresol as a preservative. The serum is then tested on guinea pigs for sterility and toxicity.

When using the serum prepared in the above manner for injection into the human organism, the injections are given subcutaneously. For the first subcutaneous injection five minims of serum are used and the second injection given seven days later uses 10 minims. The therapy after the second dose is continued according to the welfare of the patient.

In the practice of the invention, while making the serum, castrated animals are used because it is believed that the young organism of the castrated donkey is craving for those substances so necessary to it of which the organism has been deprived by the castration operation. The organism of the castrated animal thus absorbs and assimilates these substances very easily for its own benefit when supplied in the form of the gland implanted in the flank muscles. In normal, not castrated animals, I am afraid to produce a pathological condition by the excess of such substances in the organism by the implantation of glands. It may be that the serum of such animals becomes toxic from the reaction of the organism against these substances which are not necessary for its well being.

In the practice of the invention, the animals are injected with the human blood serum for the following reason: The blood of the donkey undergoes changes during the period in which the implanted gland is being absorbed. At the finish of the absorption period serum made from blood withdrawn from the treated donkey would, if injected into an old donkey with high blood pressure, benefit the injected animal. There would be very little, if any, adverse reaction from the injection because the blood of the two donkeys is of the same type and no readjustment of the organism is necessary before the second donkey can assimilate and derive benefit from the peculiar substances carried by the serum derived from the blood of the first donkey. On the other hand, considerable readjustment is necessary when serum or blood from one species, such as a horse or donkey, is injected into the organism of another species, such as a human being. By the injection of human serum into the donkey a severe reaction is brought about and the animal is quite sick while the organism is adjusting itself to the new conditions incited by the serum injection. The blood of the injected animal takes on new properties during the readjustment reaction and assumes some of the properties of the blood of the other species so that serum made from the blood withdrawn from an animal so treated by the injection of human serum will be very easily assimilated by the human system. Very little adjustment is necessary in the human system to accommodate and assimilate this serum, for this adjustment process has previously taken place in the blood stream of the injected donkey. Serums made in accordance with this injection method I designate as humanized serums.

In the practice of the invention making use of the humanized gland serum for injection into the human organism, the patient from the day following the first injection feels better and all symptoms, like headache, dizziness and weakness are improved and blood pressure starts to return to normal. Patients with 200 systolic pressure after a few injections had only a pressure of 150. This serum was also tried on patients with very low blood pressure, those with only 100 systolic pressure after a few injections came up to 125. These results show the action of the humanized gland serum as a regulator of the blood pressure.

I claim:

1. The process of preparing a serum which comprises implanting a gland in the tissues of an animal deficient in the substances produced by the gland, injecting the animal with human serum and withdrawing serum from the treated animal.

2. The process of preparing a serum which comprises castrating an animal while sexually immature, implanting a corresponding gland from an animal of a different species in the tissues of the castrated animal, injecting the treated animal with human serum, withdrawing serum from the treated animal and preparing the withdrawn serum for medical use.

3. The process of preparing a serum which comprises castrating an animal while sexually immature, implanting a corresponding gland from an animal of a higher evolutionary order in the tissues of the castrated animal, injecting the treated animal with human serum, withdrawing serum from the treated animal and preparing the withdrawn serum for medical use.

4. The process of preparing a serum which comprises depriving an animal of a specific gland, implanting a corresponding gland from an animal of a different species in the tissues of the deprived animal, injecting the treated animal with human serum, withdrawing serum from the treated animal and preparing the withdrawn serum for medical use.

5. The process of preparing serum which comprises castrating an animal while sexually immature, permitting the animal to exist for at least six months without the substances produced by the glands, implanting in the muscles of the castrated animal a corresponding gland from an animal of a different species, permitting the organism of the animal to absorb the substances of the implanted gland, injecting the treated animal with human serum, withdrawing serum from the injected animal and preparing the withdrawn serum for medical use.

6. A serum derived from an animal deficient in a substance produced by a gland, such serum resulting from the implantation in the animal of a corresponding gland from an animal of a different species together with injection of human serum.

7. A serum derived from an animal deficient in a substance produced by a genital gland, such serum resulting from the implantation in the animal of a genital gland from an animal of a different species together with injection of human serum.

In testimony whereof I affix my signature.

CONSTANTINE LEVENTIS, M. D.